July 16, 1929.    G. CAWLEY    1,720,999

MEASURING PUMP

Filed July 16, 1927

Inventor
GEORGE CAWLEY

By K. P. McElroy

Attorney

Patented July 16, 1929.

1,720,999

UNITED STATES PATENT OFFICE.

GEORGE CAWLEY, OF MONTCLAIR, NEW JERSEY, ASSIGNOR TO THE PERMUTIT COMPANY, OF NEW YORK, N. Y., A CORPORATION OF DELAWARE.

MEASURING PUMP.

Application filed July 16, 1927. Serial No. 206,282.

My invention relates to measuring pumps; and it has particular reference to a pump embodying the principles of the Archimedean screw, wherein water is raised from one level to another by means of a hollow helix; all as more fully hereinafter set forth and as claimed.

In a copending application, Serial No. 153,147, filed December 7, 1926, patented July 31, 1928, No. 1,678,766, I have described apparatus for delivering a predetermined amount of liquid chemical to water in order to correct the basicity thereof. In general, this apparatus comprises a meter for measuring the water, the operation of which actuates an electrical switch in turn controlling the operation of a measuring pump. More particularly, the measuring pump is adapted to deliver a definite amount of chemical to the water for each revolution thereof, the number of revolutions during a given period of operation being determined by the quantity of water flowing through the meter. In this application, I wish to describe more fully and to claim the measuring pump per se.

For my purposes, a hollow helix serves very well to deliver the chemical to the water, but, in order to deliver a definite quantity of acid for each revolution of the pump, and to obtain satisfactory operation in other respects, it is necessary to make the helix in conformity with certain requirements. Hollow helixes for delivering liquid from one level to another are broadly old; in fact, the general principle has been recognized for centuries. A helix of this type is commonly known as an "Archimedean screw", or "screw of Archimedes". When one end of a hollow helix is immersed in water, and the helix inclined to the water surface or horizontal, rotation of the helix develops a pumping action which causes the water to be elevated in the screw, with delivery of water at the higher end thereof. The volume of liquid delivered per revolution of 360 degrees of the helix, is, however, variable, depending upon the inclination of the longitudinal axis of the helix to the horizontal, the inclination of the axis or center line of each turn to the horizontal, the head of water, etc. It is the purpose of this invention to construct an Archimedean screw so that a definite volume of liquid will be delivered for each rotation, or, in other words, to make the screw a measuring device as well as a pump.

Figure 1:
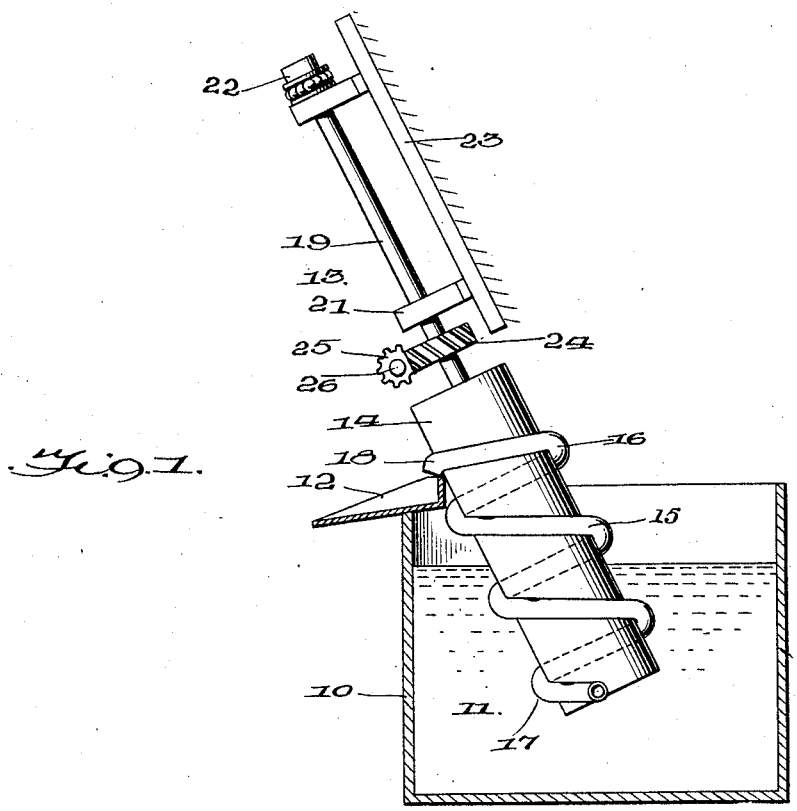
Figure 2:
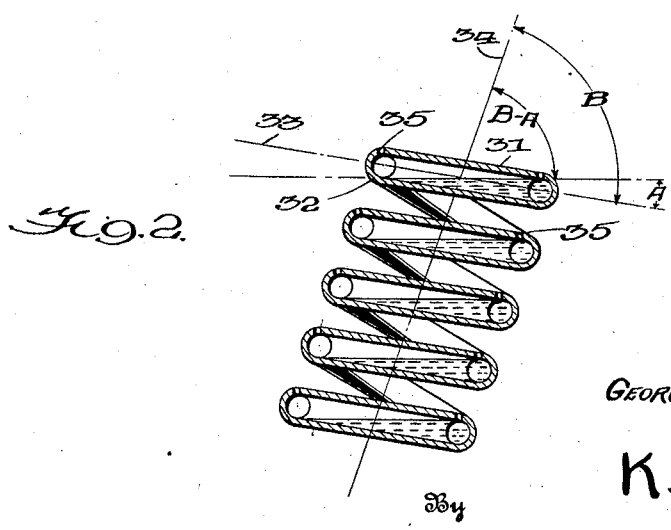

A typical embodiment of the invention is illustrated in the accompanying drawing, wherein, Fig. 1 is a side elevational view, with parts shown in cross-section, of a measuring pump, and, Fig. 2 is a diagrammatic view of a portion of the screw, illustrating the relations existing between the component parts thereof.

In the assembly shown in Fig. 1, a tank 10, adapted to receive a quantity of chemical such as acid 11, is provided adjacent its top with a trough 12 into which the acid is delivered by means of a measuring pump, indicated as a whole by the reference numeral 13.

The pump 13 comprises an acid-resistant cylindrical member 14 upon which is wound a hollow helix 15 made of tubing having a uniform bore and composed of a number of connected and regularly spaced turns or convolutions 16, the lower of which, 17, is disposed beneath the liquid level, and the upper of which, 18, is positioned above the trough 12. The longitudinal axis of the cylinder 14 and the axes of the turns 16, 17, and 18, are positioned at an angle to the horizontal, as hereinafter described. Vitreous materials are sufficiently strong for most sizes of cylinders or screws.

The cylinder 14 is affixed to the end of a shaft 19 of acid resistant material, such as bronze, which is mounted in a sleeve bearing 21 and a thrust bearing 22, both of which are secured to a suitably disposed frame member 23. A gear wheel 24, keyed to the shaft 19, engages another gear 25 that is disposed on a shaft 26, to provide a driving connection for the pump 13. This driving connection, is, according to my stated copending application, so operated as to cause the rotation of the pump 13 at intervals to effect the delivery of chemical from the tank 10 to the water to be treated.

The angles of inclination of the various parts of the screw should be carefully determined, in order that the pump may deliver a definite and fixed quantity of liquid for each revolution thereof. When such control is exercised, it is possible to operate the device with either a clockwise or counter-clockwise drive. With the former, a right hand screw is employed, and the longitudinal axis of the helix is inclined to the horizontal at any angle of less than 90 degrees. When a counter-clockwise drive is used, the screw is left handed. It is advantageous to employ angles of inclination between 45 and 90 degrees, (or between 90 and 135 degrees), for such inclinations permit a pump of given length to be immersed to a greater depth, or, in another aspect, permit the use of a shorter pump for a given size tank. It is always desirable to immerse the pump so that the lower turn 17 is adjacent the bottom of the tank 10, to eliminate the necessity of frequent refilling of the tank. When possible, I employ a right hand screw and clockwise feed, and an inclination of about 70 degrees between the longitudinal axis of the helix and the horizontal.

Each turn of the screw, as indicated in Fig. 2, is so inclined to the horizontal that, if this turn were half immersed, the liquid level would touch the upper wall 31 of the turn adjacent its extremity, and the lower wall 32 of the turn at its opposite extremity. The liquid surface, in such case, would constitute a diagonal bisecting plane for the space defined by the hollow portion of each turn. Expressed in another manner, during periods of rest, the aperture in the turn will retain exactly half its own volume of liquid, which will extend from the opposite extremities thereof, and touch the upper and lower walls. Of course, the wall is cylindrical, but by referring to the cross-sectional view, the significance of this definition will be apparent.

For purposes of reference, the angle between the center line 33 of the turn and the horizontal reference plane may be designated as A. This angle, when determined as just indicated, is a constant for any given screw of uniform pitch. Likewise, for any given screw, the angle between the longitudinal axis 34 and the center line 33 is a constant, and this angle may be called B. The proper inclination of the pump in the tank 10 is then immediately given by the value of (B—A). For practical purposes, using ordinary sizes of apparatus, the angle A may be about 10 degrees, and, if the inclination, (B—A) is 70 degrees, then the screw should be wound with the angle B equal to about 80 degrees.

Each turn is provided with one or more vents 35, passing through its upper wall near the extremities of the aperture, which admit air within the exposed turns of the screw, and hence prevent back-siphoning of the liquid when the pump is stopped or when the liquid level in the tank falls below the lower turn 17. The vents should be positioned as near the outside limits of the apertures as possible, in order to prevent loss of liquid through them. Considering the helix as a whole the vents 35 form two longitudinal series, the two series being diametrically opposite. It will be noted, from Fig. 2, that no liquid escapes when the turn is half-full. This retention depends also upon the critical angle established between the center line 33 and the horizontal, as will appear if another angle is chosen. Thus, if the angle (B—A) is increased, or if the longitudinal axis is brought more nearly to the perpendicular, then some of the liquid will run back, escaping through the left hand opening in the turn. If the value of (B—A) is made less, thereby increasing the angle between the horizontal and the center line 33, some of the liquid will run out of the vent 35. The critical position shown however, permits the retention of a maximum and definite quantity of liquid, although apertures are also included to prevent back-siphoning.

Each turn delivers its contents to the adjacent higher turn during one complete revolution, being replaced by the same volume of liquid chemical from the adjacent lower turn. The upper turn 18 accordingly delivers a definite volume of liquid for each revolution, which volume is one half that of the aperture in each turn. The contents of each turn remain in place during periods of rest, and hence the screw measures and delivers definite quantities of chemical, irrespective of the time rate of operation.

With some types of screws, not disposed at the angles indicated, there is not only a pumping action, but also a centrifugal action, which causes the delivery of varying quantities of liquid, depending on the head of the liquid and the rate of rotation of the pump. These effects are not present in this device, as the delivery from turn to turn is fixed by the size of the aperture therein, and not by the pressure of the liquid or the speed of operation.

It is advantageous to wind the screw or helix 15 on a cylinder to lengthen the turns and increase the capacity, and it is also permissible, with this construction, to eliminate bearings or shafts disposed in the tank 10, where they would be subject to the corrosive action of the chemical.

What I claim is:

1. A measuring pump comprising a plurality of connected turns in the form of a tubular helix having a continuous aperture formed therethrough and vented at regular intervals, said turns being so inclined with respect to the horizontal that a line drawn parallel to the horizontal would intersect the walls of the aperture in each turn at the outside limits thereof and on opposed top and bottom walls.

2. A measuring pump comprising a plurality of connected uniformly inclined turns in the form of a tubular helix having a continuous aperture formed therethrough and vented at regular intervals, a mounting for said helix, the mounting being so positioned that the angle between the longitudinal axis of the helix and the center lines of the turns is equal to the sum of the angles between the longitudinal axis and the horizontal plus the angle formed by passing a plane through the upper and lower opposed extremities of the aperture in a turn.

3. A measuring pump comprising a plurality of connected uniformly inclined turns in the form of a helix having a continuous aperture formed therethrough, two diametrically opposed series of vents formed through the upper walls of the turns adjacent the extremities thereof, and a mounting for the helix so disposed that the turns thereof are inclined to the horizontal at such an angle that a line drawn parallel to the horizontal would intersect the walls of the aperture in a turn at the outside limits of the upper and lower walls thereof.

4. A measuring pump adapted to deliver a predetermined and constant volume of liquid from a body in which such pump is partially immersed, for each revolution thereof comprising a support, a shaft rotatably mounted on the support and inclined at an angle to the horizontal, a cylinder secured to the lower end of the shaft and aligned therewith, a hollow tube wrapped helicoidally around the cylinder, said tube being provided with uniformly spaced turns, vents formed in the upper boundary walls of said turns adjacent the extremities thereof and in communication with the interior of the tube, said cylinder and tube as a whole, and the individual turns of said tube, being so inclined with respect to the horizontal that a line drawn parallel to the horizontal intersecting the lower extreme interior point of any turn will also intersect the upper extreme interior point of said turn, whereby, when said pump is immersed in liquid, each turn will always retain while at rest a volume of liquid equal approximately to half the volume of the turn, and will deliver when said pump is rotated the same volume of liquid for each rotation of the pump.

In testimony whereof, I have hereunto affixed my signature.

GEORGE CAWLEY.